United States Patent Office

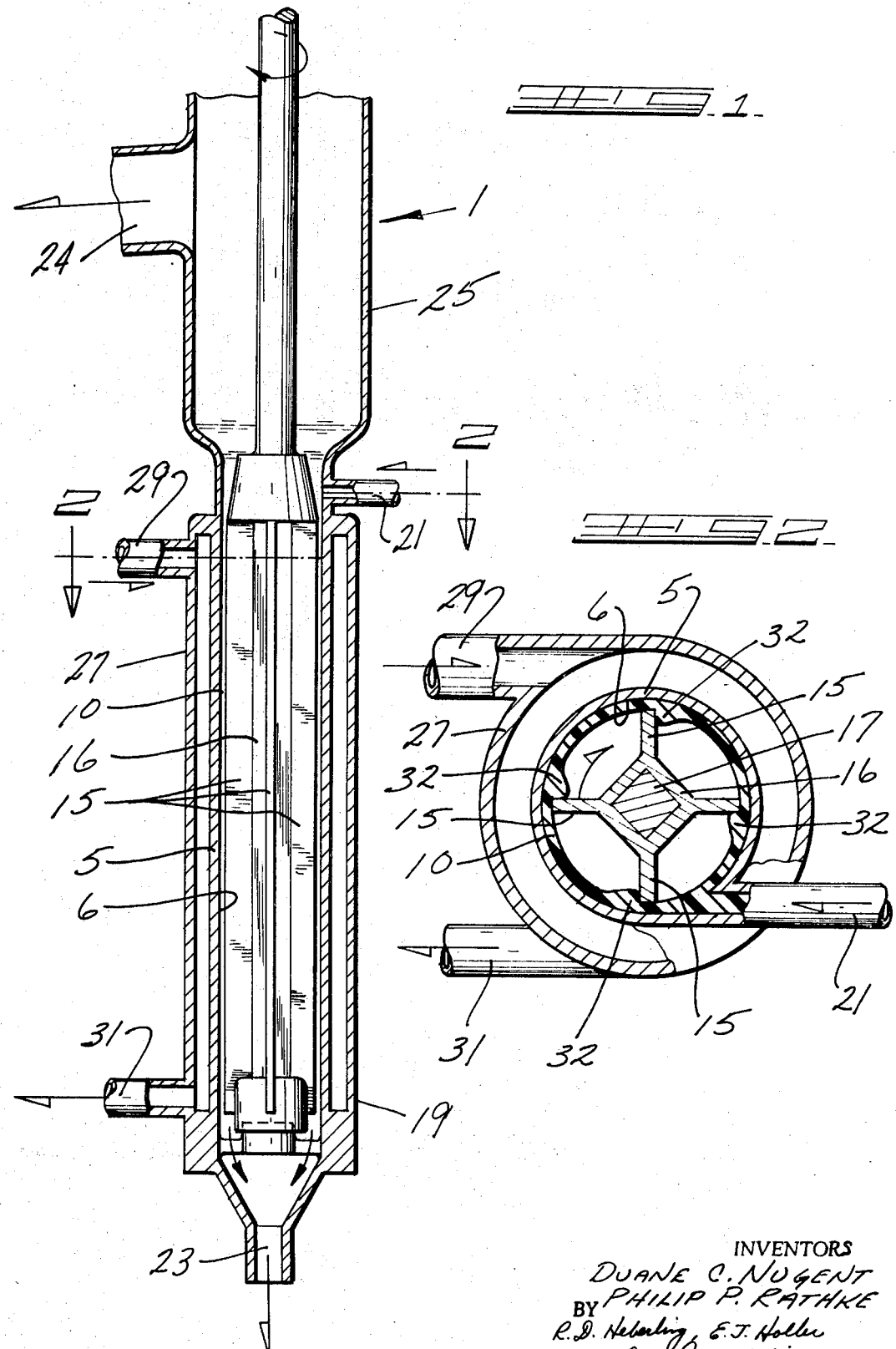

3,634,321
Patented Jan. 11, 1972

3,634,321
METHODS OF MAKING SOLID ORGANOPOLYSILOXANES
Duane C. Nugent, Perrysburg, and Philip P. Rathke, Toledo, Ohio, assignors to Owens-Illinois, Inc.
Continuation of application Ser. No. 622,361, Mar. 10, 1967. This application July 28, 1969, Ser. No. 845,314
Int. Cl. C08f 11/04
U.S. Cl. 260—46.5 R                                  25 Claims

ABSTRACT OF THE DISCLOSURE

Methods of reproducibly making solid solvent soluble organopolysiloxane prepolymers from a trifunctional monomer such as methyltriethoxysilane, water and an acid catalyst. After obtaining a viscous hydrolysis and condensation prepolymer product, the prepolymer is tailor-made for ultimate preparation into a solid powder or flake form by giving the prepolymer a certain additional heat history, forming a liquid film thereof having a certain viscosity in the range of about 30 to 310 centipoises at 60% solids at 25° C. in ethanol, and thereafter heating the film for a time sufficient to obtain a precured polymer that is solid and tack-free at room temperature and free from gel. The forming of the film and heating is preferably accomplished in a wiped film evaporator employing certain conditions of time and temperature. The tailor-made polymer from the evaporator is then spray dried or otherwise made into a solid flake or powdered form of solvent soluble, further curable organopolysiloxane precured plymer. For precured polymers for flexible coatings, a thin film is formed from a prepolymer without additional heat history having a viscosity of about 20 to 50 centipoises at 60% solids at 25° C. in ethanol, and thereafter the film is heated for a time sufficient to obtain a precured polymer that is a viscous liquid at room temperature and free from gel. This precured polymer can be easily dissolved in a solvent for coating applications.

CROSS-REFERENCES TO RELATED APPLICATIONS

This is a continuation application of Ser. No. 622,361, filed Mar. 10, 1967 now abandoned.

THE INVENTION

The present invention relates to methods of reproducibly making solid or liquid forms of solvent soluble, further curable organopolysiloxane precured polymers prepared from trifunctional alkyl or aryl trialkoxysilanes, water and an acid catalyst.

In the past, it has been difficult to make solid solvent soluble further curable organopolysiloxane precured polymers derived from trifunctional silane monomers in powder form in a reproducible manner. Such polymers, made from starting ingredients including alkyltrialkoxysilanes, water and an acid catalyst, have been made but quite often when the solid form was prepared, the solid was undesirably soft at room temperature or gelled before forming the desired hard, solid solvent soluble precured polymer.

The present invention solves the problem of not being able to consistently produce the solvent soluble, thermoplastic, further curable organopolysiloxane precured polymer in a hard, easy to handle, solid form such as a powdered or flaked form. The problem of reproducibly preparing a liquid precured polymer for consistently making good flexible coatings is also solved by the present invention.

Accordingly, it is an object of the present invention to provide methods of reproducibly making powdered, or other easy to handle, stable solid or liquid forms of organopolysiloxanes derived from trifunctional alkyl or aryl trialkoxy monomers.

It is an object of the present invention to provide a method of reproducibly making powdered or other solid forms of organopolysiloxanes derived from trifunctional alkyl or aryl trialkoxy monomers, the methods including the steps of heating the resultant prepolymer to provide it with an additional heat history and precuring the same under certain conditions of time and temperature.

It is an object of the present invention to provide a method of reproducibly preparing a solid solvent soluble further curable organic partial condensation product organopolysiloxane precured polymer prepared from a trifunctional monomer such as methyltriethoxysilane, the method including forming a liquid film of the prepolymer having a viscosity equivalent to that of about 30 to 310 centipoises at 60% solids at 25° C. in ethanol, and heating the film to evaporate solvent and increase the viscosity of the prepolymer at about 90 to 180° C. for a time sufficient to obtain a solid solvent soluble precured polymer that is tack-free at room temperature and substantially free from gel.

It is an object of the present invention to provide a method of making a liquid precured polymer that consistently makes good flexible coatings, the polymer being prepared from a trifunctional silane such as methyltriethoxysilane or phenyltriethoxysilane or mixtures thereof.

These and other objects will become apparent from the specification that follows, the appended claims and the drawings, in which:

FIG. 1 is fragmentary front elevational view partly in section of a wiped film evaporator used to form a liquid film of an organopolysiloxane prepolymer and heat the film for a time sufficient to ultimately provide a solid or liquid solvent soluble precured polymer that is free from gel; and FIG. 2 is a fragmentary sectional view taken on the line 2—2 of FIG. 1 and on a larger scale than FIG. 1.

The present invention provides a method of preparing a solvent soluble further curable organic partial condensation product organopolysiloxane precured polymer prepared from the reaction of:

(1) A silane such as methyltialkoxysilane, phenyltrialkoxysilane and a mixture of methyltrialkoxysilane and phenyltrialkoxysilane in which the alkoxy group contains 1 to 6 carbon atoms, (2) At least about 1.5 moles of water for every mole of total silane present, and (3) At least a trace of acid, at a temperature of about 50° C. to 160° C. for about 1 to 10 hours, the method comprising the steps of:

(A) Forming a liquid film of the prepolymer having a viscosity equivalent to that of about 30 to 310 centipoises at 60% solids at 25° C. in ethanol, and (B) Heating the film at a temperature of about 90 to 180° C. for a time sufficient to obtain a solid solvent soluble general purpose precured polymer that is tack-free at room temperature and substantially free from gel or a liquid precured polymer that is fee from gel or a liquid precured polymer that is free from gel and capable of consistently making excellent flexible coatings.

The above-described method of preparing a solid or liquid solvent-soluble further curable organopolysiloxane precured polymer is preferably carried out by introducing a prepolymer feed into a wiped film evaporator 1 having a chamber wall 5 with an inner surface 6 thereof. As indicated above, a liquid film 10 of the feed is formed from the prepolymer generally having a viscosity equivalent to that of about 30 to 310 centipoises at 60% solids at 25° C. in ethanol and the film 10 is heated as it flows down the chamber wall 5 at a temperature of about 90°

C. to 180° C. to evaporate solvent and to increase the viscosity of the prepolymer and apparently further polymerize the same to provide a precured polymer that is free from gel and can be used in the liquid form to prepare flexible coatings or can be spray dried or otherwise converted to a general purpose solid that is tack free at room temperature.

As seen in the drawings, the film is wiped by four blades 15 that project from an integral hollow central portion having a square cross sectional outline mounted on a square shaft 17 which is driven by means not shown to provide a wiping action on the film being precured. The blades 15 are equally spaced around the periphery of the shaft 17 and extend longitudinally nearly the entire length of the lower cylindrical portion 19 of the evaporator 1. The prepolymer is fed in through inlet 21 and the precured polymer leaves the evaporator through outlet 23. Solvent stripped off is removed through vapor exit 24 of an upper portion 25 of the evaporator. The concentric chamber 27 is provided around the lower portion 19 of the evaporator for heating the wall 5. The heating fluid, steam, is fed in through inlet 29 and it leaves through outlet 31.

As best seen in FIG. 2, a wave 32 of liquid film 10 is built up ahead of each of the blades 15 and pushed thereby, the blade acting as a wiper blade to provide the solvent stripping, wiping and precuring action.

Suitable trifunctional silane starting materials to provide the precured polymers are methyltrialkoxysilanes, ethyltrialkoxysilanes, phenyltrialkoxy silanes, or mixtures thereof in which the alkoxy group has 1 to 6 carbon atoms and preferably 2 carbon atoms.

The preferred trifunctional material is methyltrialkoxysilane or a mixture thereof with phenyltrialkoxysilane in which the alkoxy group is preferably ethoxy. It is preferred that the molar ratio of methyltrialkoxysilanes to phenyltrialkoxysilanes in a mixture of the two is about 2:1 although generally good results can be obtained using a ratio of about 1.5:1 to 2.5:1. A precured polymer for laminates and coatings and even flexible coatings can also be made with molar ratios of preferably abut 1:3.5 to 1:4.5 and more preferably about 1:4.

In general, prepolymers to be precured and thereafter spray dried or otherwise converted to solvent-soluble liquids or solids that are free from gel and in the case of solids that are tack free at room temperature are prepared by:

(I) Heating a mixture of—

(A) A silane that is methyltrialkoxysilane, ethyltrialkoxysilane, phenyltrialkoxysilane, or mixtures of methyltrialkoxysilane and phenyltrialkoxysilane in which the alkoxy radical contains from 1 to 6 carbon atoms and preferably 2 to 3 carbon atoms; and (B) At least a trace of acid and at least about 1.5 moles of water for every mole of total silane present, at a temperature preferably of about 65° to 85° C. for a period of time of from about 1 to about 10 hours; and (II) Concentrating the liquid siloxane partial condensation product from step I to remove some but not all volatile material including alkanol by-product and some water and to obtain a liquid residue having a viscosity equivalent to that of preferably about 30 to 65 centipoises at 60% solids at 25° C. in ethanol.

Thereafter the prepolymer product of step II is precured at a temperature of from about slightly below, say 5° C., to as much as about 50° C. below the gel point of the resin for a period of time of from about 10 seconds to about 60 minutes, the 60 minutes requiring the lower temperatures. As previously indicated, the precuring is accomplished by forming a liquid film of the prepolymer product of step II and heating the same at about 90° to 180° C.

As used here, the gel point is that temperature at which a 50-gram sample of prepolymer gels when placed in a 100 ml. beaker and stirred on a 600° F. hot plate.

The mixture of methyl and phenyl precured polymers is preferably made by:

(I) Heating a mixture of—

(A) From about 1 to about 5 moles of methyltriethoxysilane and from about 5 to about 1 mole of phenyltriethoxysilane;

(B) From about 1.5 to about 3 or 4 moles of water for every mole of total silane present, there being less than 0.01 mole of acid present in the reaction mixture per mole of said silane introduced thereto at a temperature of about 80° C. for a period of time of from about 2 to about 6 hours;

thereafter, the mixture is further processed by (II) Concentrating the liquid siloxane partial condensation product from step I by distilling at the reaction temperature until approximately 60–70% of the theoretical yield of ethanol is removed, thereby to remove some but not all volatile material including alkanol by-product and some water and to obtain a liquid residue that in the case of a methyl silane/phenyl silane ratio of about 2.5:1 to 1.5:1 has a viscosity of about 30 to 60 or 65 centipoises at 60% solids and 25° C. in ethanol or in the case of a methyl/phenyl ratio of about 1:3.5 to 1:4.5 has a viscosity of about 150 to 310 centipoises; and (III) Precuring the prepolymer product of step II by forming a thin film thereof by heating the film to a temperature of about 90° to 180° C. which is a temperature of from about slightly below the gel point to about 30° C. below the gel point of the resin and holding this temperature for a period of time of from about 5 to 10 up to about 120 seconds.

Step III above is preferably accomplished by a heating of the liquid film of a prepolymer having a predetermined gel point of about 175° C. to 210° C. at about 170° to about 190° or 195° C.

The precured polymer from the methyltrialkoxysilane is generally prepared by a method that includes the steps of:

(I) Heating a mixture of—

(A) A methyltrialkoxysilane wherein the alkoxy radical contains less than 4 carbon atoms and from 0 to 5 mole percent, based on total silane reactant material, of at least one compound represented by the general formula

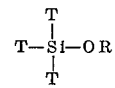

wherein R in the alkoxy radical —OR represents an alkyl radical having less than 4 carbon atoms such as methoxy and ethoxy, and each T independently represents an aryl, alkyl or alkenyl radical, each of which contains less than 7 carbon atoms, or the aforementioned alkoxy radical, —OR, and (B) From 1.5 to about 10 moles and preferably from 1.5 to about 3 moles of water per mole of total silane and water reactant material, said mixture containing by weight from 0 to 700 parts of acid, expressed as HCl, per million parts of total silane and water reactant material, said maximum of 700 parts of acid being the approximate upper limit when using a silane:water mole ratio of 1:1.5 and decreasing to a maximum of 1 weight part of acid, expressed as HCl, per million parts of total silane and water reactant material when the silane:water mole ratio employed is 1:10, the heating of the said mixture to form a liquid siloxane partial condensation product being continued for from 1 to 10 hours at temperatures of at least 50° C. while retaining in said mixture at least 1.5 moles of alkanol by-product per mole of silane starting material assuming complete hydrolysis of all alkoxy-silicon linkages in the liquid reaction mixture;

(II) Concentrating the liquid siloxane partial condensation product from step I by gradually raising its temperature above its initial reaction temperature to a maximum temperature within the range of from about 65° to 300 C. and preferably about 80° to 85° C. thereby to remove some but not all volatile material including alkanol by-product and some water and to obtain a liquid residue having a viscosity equivalent to that of about 15 to 35 centipoises at 50% solids at 25° C. in ethanol (which is about 21 to 41 centipoises at 60% solids at 25° C. in ethanol); and (III) Precuring the concentrated liquid siloxane partial condensation prepolymer product from step II by forming a liquid film thereof and heating it at a temperature of about 90° C. to 180° C. which is generally slightly below its gelation point to remove the remainder of the volatile material and to obtain, without gelation, a more highly condensed, organic solvent soluble, siloxane partial condensation precured polymer product that is capable of being finally cured to a solid organopolysiloxane resin. The precured resin, as previously indicated, when solid is also tack-free at room temperature and is substantially free from gel. When the precured polymer is liquid, it is also free from gel and capable of forming consistently good flexible coatings.

In preparing a general purpose precured polymer from a mixture of methyl and phenyltrialkoxysilanes, the liquid film is preferably one with an additional heat history having a viscosity equivalent to that of about 50 to 65 centipoises and optimally, 55 to 60 centipoises, at 60% solids at 25° C. in ethanol, and the heating of the film is preferably conducted at about 160° to 180° C., and optionally, about 165 to 175° C. The best general purpose (coating, molding, laminating) precured polymer is generally obtained at about 57 to 58 centipoises and the heating done at about 169 to 170° C.

For flexible coatings, the prepolymer prepared from methyl and phenyltrialkoxysilanes without additional heat history is formed into a liquid film from material preferably having a viscosity equivalent to that of about 35 to 40 centipoises at 60% solids at 25° C. in ethanol and the film is preferably heated at about 93° to 97° C. to remove solvent and increase the viscosity of the prepolymer and apparently further polymerize the same. The best results for flexible coating applications, are generally obtained when the film is formed of a material having a viscosity of about 38 centipoises and the film is heated at about 95° C.

In the case of a general purpose prepolymer made from methyltrialkoxysilane such as the methyltriethoxysilane homopolymer, the film is formed from a material having additional history and preferably having a viscosity equivalent to that of about 25 to 35 centipoises, and optimally, 28 to 32 centipoises at 50% solids at 25° C. in ethanol, and the heating is preferably accomplished at about 150° to 170° C. with the best results being obtained at about 155 to 165° C. In the case of flexible coatings, the methyltriethoxysilane prepolymer without additional heat history, that is made into the liquid film, is preferably one having a viscosity equivalent to that of about 18 to 22 centipoises at 50% solids at 25° C. in ethanol and the heating is done preferably at about 93° to 97° C.

EXAMPLE 1

An organopolysiloxane prepolymer was prepared from methyltriethoxysilane and phenyltriethoxysilane, using 2 moles of the methyl silane and 1 mole of the phenyl silane. The mixture of methyl and phenyltriethoxysilanes was hydrolyzed and condensed with 9 moles of water and 2.5 parts of HCl per million parts of water and silane, the silanes first being purified by distillation to about zero p.p.m. of HCl.

The reaction mixture was heated with agitation in a flask equipped with a condenser until the pot temperature reached 80° C. This temperature was maintained for 4 hours. After about 20 minutes, the two-phase reaction mixture clarified to a one-phase system due to the ethanol liberated in the reaction acting as a mutual solvent. At the end of the 4-hour period, approximately 282 g. of an ethanol-water mixture (about 92% alcohol) was removed by distillation. The hydrolysis and condensation reaction and concentration thereafter produced a viscous liquid.

The viscous liquid having a viscosity of about 40 centipoises at 60% solids at 25° C. in ethanol, was transferred to a wiper film evaporator and precured, a liquid film being formed of the prepolymer which film was then heated. The evaporator operated at a wall temperature of about 100–120° C. so that the liquid product being processed has a temperature of about 92–97° C. The mean residence time at the temperature of 92–97° C. was less than 120 seconds, about 20 seconds.

The resultant precured polymer was dissolved in a solvent (n-butanol) and the resultant solution coated on an aluminum panel which was cured at 250° C. for 3 minutes. The resultant coating was flexible and strong.

The precured polymer can also be dissolved in other solvents such as ethanol and acetone to provide good flexible coatings.

EXAMPLE 2

A viscous prepolymer was prepared by hydrolyzing and condensing methyltriethoxysilane and phenyltriethoxysilane as described in Example 1 to obtain liquid having a viscosity of about 40 centipoises at 60% solids and 25° C. The liquid was refluxed for 15 hours to provide the same with a heat history and a final viscosity of about 60 centipoises at 60% solids and 25° C.

The liquid was then precured in a wiped film evaporator operating at a 195–200° C. wall temperature to provide a liquid product temperature of about 170–175° C. for a mean residence time of less than 40 seconds, namely 20 seconds. The resultant precured material was treated by spray drying to form a dry powdered solvent soluble siloxane partial condensation precured polymer product that is further curable to a thermoset polymer.

The resultant powdered porduct produced excellent coatings, laminates and moldings. Coatings from the polymer of this example are not as flexible as the coatings of the polymer of Example 1.

EXAMPLE 3

An organic partial condensation prepolymer product was prepared by hydrolyzing and condensing about 1 mole of methyltriethoxysilane with 2½ moles of water and 3 weight parts of HCl per million parts of water and silane, the silane first being purified by distillation to about zero p.p.m. of HCl.

The reaction mixture was heated with agitation in a flask equipped with a condenser until the pot temperature reached 80° C. This temperature was maintained for 4 hours. After about 20 minutes, the two-phase reaction mixture clarified to a one-phase system due to the ethanol liberated in the reaction acting as a mutual solvent. At the end of the 4-hour period, approximately 78 g. of an ethanol-water mixture (about 92% alcohol) was removed by distillation. The hydrolysis and condensation reaction and concentration thereafter produced a viscous liquid.

The viscous liquid, having a viscosity of about 20 centipoises at 50% solids at 25° C. in ethanol, was further treated by forming a film thereof and heating the film in a wiped film evaporator. The evaporator was operated at a wall temperature of about 110° C. that provided a product temperature of about 95° C. The mean residence time was about 20 seconds.

The resultant precured material was dissolved in n-butanol and excellent flexible coatings were prepared from the precured polymer solution.

EXAMPLE 4

A viscous prepolymer having a viscosity of 20 centipoises at 50% solids at 25° C. in ethanol was prepared as described in Example 3. The prepolymer was refluxed at 50% solids for 20 hours to increase the viscosity to 30 centipoises at 50% solids at 25° C. in ethanol.

A liquid film was formed of the prepolymer and the film heated in a wiped film evaporator. The evaporator was operated at a wall temperature of about 200° C. which provided a product temperature of about 170° C. The residence time was less than one minute, about 30 seconds.

The resultant heated material was cooled and converted into a solid solvent soluble precured polymer by dissolving in methylene chloride and spray drying. Excellent moldings and laminates were prepared therefrom.

EXAMPLE 5

A viscous organopolysiloxane prepolymer was prepared from 4 moles of phenyltriethoxysilane, 1 mole of methyltriethoxysilane, 20 moles of water, and 10 parts by weight of HCl per million parts by weight of water and silane, the silanes first being purified by distillation to approximately zero parts per million of HCl. The resultant hydrolysis and condensation reaction was carired out in generally the same manner as described in Example 1. A preploymer having a viscosity of 45 centipoises at 25° C. at about 61 to 61.5% solids in ethanol was obtained. The prepolymer viscosity at 60% solids is slightly less, say about 44 centipoises.

The prepolymer was heated at reflux and given a heat history of 18 hours to thereby increase the viscosity to approximately 180 centipoises at 60% solids at 25° C. in ethanol. The wiped film evaporator then was used to strip the solvent and further polymerize the prepolymer, the product temperature being about 170° C. and the wall temperature of the evaporator being about 197° C. The mean residence time was less than 1 minute, about 30 seconds. As described in the previous examples, coatings, laminates and moldings were made from the above-described precured polymer.

In the above Example 5, the viscosity of the prepolymer fed into the wiped film evaporator can vary from about 150 to 310 centipoises at 60% solids at 25° C. in ethanol. In general, such a material is prepared by a 15 or 16 up to a 19 or 20 hour heat history reflux on a starting prepolymer of about 40 to 41 up to 48 to 49 centipoises at 60% solids. In order to obtain a precured polymer that is tack-free at room temperature and free from gel, the product temperature in the wiped film evaporator can be at about 195 to 200° C. The mean residence time should be less than about 1 minute and is preferably about 15 to 30 seconds.

The film in all the examples that is heated preferably from about 90 or 95° C. to 170 or 180° C. is generally about ½ to 10 or 15 mils in thickness.

It will be understood that, in accordance with the provisions of the patent statutes, modifications and variations of the present invention may be made without departing from the spirit and scope thereof.

What is claimed is:
1. A method for reproducibly preparing a solvent soluble further curable organic partial condensation product organopolysiloxane precured polymer prepared from the reaction of:
   (1) a silane of the group consisting of a methyltrialkoxysilane, ethyltrialkoxysilane, phenyltrialkoxysilane and mixtures thereof in which the alkoxy group contains 1 to 6 carbon atoms,
   (2) at least about 1.5 moles of water for every mole of total silane present and
   (3) at least a trace of acid, at a temperature of about 50° C. to 160° C. for about 1 to 10 hours,
the method comprising the steps of:
   (A) forming a liquid film of the prepolymer having a viscosity equivalent to that of about 30 to 310 centipoises at 60% solids at 25° C. in ethanol, said film having a thickness of about ½ to fifteen mils, and
   (B) heating the film at a temperature of about 90 to 180° C. for a time sufficient to obtain a solvent soluble precured polymer that is substantially free from gel.

2. A method as defined in claim 1 in which a mixture of phenyltriethoxysilane and methyltriethoxysilane is used in which the molar ratio of the phenyl silane to methyl silane is about 3.5:1 to 4.5:1, and the viscosity of the prepolymer of step A is about 150 to 310 centipoises at 60% solids at 25° C. in ethanol.

3. A method as defined in claim 2 in which the viscosity of the prepolymer used to form the film is about 44 centipoises and the heating of the film is at about 170° C. for a time of about 30 seconds.

4. A method of preparing a solvent soluble further curable organic partial condensation product organopolysiloxane precured polymer prepared from the reaction of:
   (1) a silane of the group consisting of a methyltrialkoxysilane, ethyltrialkoxysilane, phenyltrialkoxysilane and mixtures thereof in which the alkoxy group contains 1 to 6 carbon atoms,
   (2) at least about 1.5 moles of water for every mole of total silane present, and
   (3) at least a trace of acid, at a temperature of about 50° C. to 160° C. for about 1 to 10 hours,
the method comprising the steps of:
   (A) providing a heated surface,
   (B) introducing the prepolymer having a viscosity equivalent to that of about 30 to 310 centipoises at 60% solids at 25° C. in ethanol onto said heated surface,
   (C) spreading said prepolymer into a film having a thickness of about ½ to 15 mils while in contact with said heated surface and heating said film on said surface at a temperature of about 90 to 180° C. for a time sufficient to evaporate solvent and increase the viscosity of the prepolymer and to obtain a solvent soluble precured polymer that is substantially free from gel.

5. The method of claim 4 wherein said prepolymer is spread into an annular film and further including the step of withdrawing said solvent soluble precured polymer that is substantially free from gel from said heated surface.

6. A method of making a reproducible product, the method comprising the steps of:
   (A) hydrolyzing and condensing a mixture of about 1½ moles of methyltrialkoxysilane and 1 mole of phenyltrialkoxysilane with about 3 moles of water per mole of silane and about 2.5 parts of an acid catalyst per million parts of silane and water, the alkoxy radical having 1 to 6 carbon atoms;
   (B) concentrating the liquid siloxane partial condensation product by distilling at the reaction temperature to thereby remove alkanol by-product and some water to obtain a liquid concentrated product having a viscosity equivalent to that of about 30 to 45 centipoises at 60% solids at 25° C. in ethanol;
   (C) forming a liquid film of the product of step B, said film having a thickness of about ½ to 15 mils; and
   (D) heating the film at a temperature of about 90 to 100° C. for a time sufficient to obtain a solvent soluble precured polymer that is substantially free from gel.

7. A method as defined in claim 6 in which the viscosity of the product of step B is about 35 to 40 centipoises and the heating in step D is at about 93° to 97° C.

8. A method as defined in claim 6 in which the viscosity of the product of step B is equivalent to that of about 38 centipoises, and the heating of the film is at a temperature of about 95° C.

9. A method as defined in claim 6 in which the silane is a mixture of about 2 moles of methyltrialkoxysilane and 1 mole of phenyltrialkoxysilane.

10. A method as defined in claim 9 in which the silane is a mixture of methyltriethoxysilane and phenyltriethoxysilane.

11. A method of making a reproducible solid product, the method comprising the steps of:
(A) hydrolyzing and condensing a mixture of about 1½ to 2 moles of methyltriethoxysilane and 1 mole of phenyltriethoxysilane with about 3 moles of water per mole of silane and about 2.5 parts of an acid catalyst per million parts of silane and water;
(B) concentrating the liquid siloxane partial condensation product by distilling at the reaction temperature until about 60% by weight of theoretical yield of ethanol is removed, to thereby remove ethanol by-product and some water and obtain a liquid concentrated product having a viscosity equivalent to that of about 50 to 65 centipoises at 60% solids at 25° C. in ethanol;
(C) forming a liquid film of the product of step B, said film having a thickness of about ½ to 15 mils; and
(D) heating the film at a temperature of about 160° to 180° C. for a time sufficient to obtain a solvent soluble precured polymer that is solid and tack-free at room temperature and is substantially free from gel.

12. The method of claim 11 wherein step C comprises forming a moving liquid film of the product of step B, said film having a thickness of about ½ to 15 mils.

13. A method as defined in claim 11 in which the viscosity of the product of step B is about 55 to 60 centipoises and the heating in step D is about 165° to 175° C.

14. A method of making a reproducible product, the method comprising the steps of:
(A) hydrolyzing and condensing one mole of methyltriethoxysilane with about 2.5 moles of water and about 3 parts by weight of an acid catalyst per million parts of silane and water;
(B) concentrating the liquid siloxane partial condensation product by distilling at the reaction temperature until about 60% by weight of the theoretical yield of ethanol is removed, to thereby remove ethanol by-product nad some water to obtain a liquid concentrated product having a viscosity equivalent to that of about 15 to 25 centipoises at 50% solids at 25° C. in ethanol;
(C) forming a liquid film of the product of Step B, said film having a thickness of about ½ to 15 mils; and
(D) heating the film at a temperature of about 90 to 100° C. for a time sufficient to obtain a solvent soluble precured polymer that is substantially free from gel.

15. The method of claim 14 wherein step C comprises forming a moving liquid film of the product of step B.

16. A method of making a solid product as defined in claim 14 in which the viscosity of the product of step B is about 18 to 22 centipoises and the heating in step D is at about 90° to 97° C.

17. A method of making a reproducible solid product, the method comprising the steps of:
(A) hydrolyzing and condensing 1 mole of methyltriethoxysilane with about 2.5 moles of water and about 3 parts of an acid catalyst per million parts of silane and water;
(B) concentrating the liquid siloxane partial condensation product by distilling at the reaction temperature until about 60% by weight of the theoretical yield of ethanol is removed, to thereby remove ethanol by-product and some water to obtain a liquid concentrated product having a viscosity equivalent to that of about 25 to 35 centipoises at 50% solids at 25° C. in ethanol;
(C) forming a liquid film having a thickness of about ½ to 15 mils of the product of step B; and
(D) heating the film at a temperature of about 150 to 170° C. for a time sufficient to obtain a solvent soluble precured polymer that is solid and tack-free at room temperature and is substantially free from gel.

18. A method as defined in claim 17 in which the viscosity of the product in step B is about 28 to 32 centipoises and the heating in step D is at about 155° to 165° C.

19. A method for reproducibly preparing a solvent soluble further curable organic partial condensation product organopolysiloxane precured polymer prepared from the reaction of:
(1) a silane of the group consisting of a methyltrialkoxysilane, ethyltrialkoxysilane, phenytrialkoxysilane and mixtures thereof in which the alkoxy group contains 1 to 6 carbon atoms,
(2) at least about 1.5 moles of water for every mole of total silane present and
(3) at least a trace of acid, at a temeprature of about 50° to 160° C. for about 1 to 10 hours,
the method comprising the steps of:
(A) forming an annular, moving liquid film having a thickness of about ½ to 15 mils of the prepolymer having a viscosity equivalent to that of about 30 to 310 centipoises at 60% solids at 25° C. in ethanol and
(B) heating the film at a temperature of about 90 to 180° C. for a time sufficient to obtain a solvent soluble precured polymer that is substantially free from gel.

20. A method for preparing a further curable, precured, solvent soluble organopolysiloxane from a partially condensed organopolysiloxane prepolymer, said prepolymer being prepared from the reaction of
(1) a silane of the group consisting of methyltrialkoxysilane, ethyltrialkoxysilane, phenyltrialkoxysilane, and mixtures thereof, wherein the alkoxy group contains 1 to 6 carbon atoms, and
(2) about 1.5–10 moles of water per mole of silane in the presence of an effective catalytic amount of an acid at a temperature of about 50° C. to about 160° C. for about 1 to 10 hours,
said method comprising the steps of:
(A) introducing said prepolymer into a chamber having a wall and an outlet opening,
(B) forming on the inner surface of said wall a liquid film of said prepolymer,
(C) heating said film on the inner surface of said chamber wall at a temperature of about 90° to 180° C. to evaporate solvent and increase the viscosity thereof for a time sufficient to obtain a solvent soluble, precured polymer that is substantially free from gel, and
(D) removing said precured polymer through said outlet.

21. The method of claim 20 and further including wiping said film while said film is being heated in the manner recited in step C.

22. The method of precuring a further curable organopolysiloxane prepolymer, wherein said prepolymer is a hydrolysis and partial condensation product prepared by a method comprising reacting methyltrialkoxysilane, or phenyltrialkoxysilane, or ethyltrialkoxysilane or mixtures thereof, wherein said alkoxy group contains 1 to 6 carbon atoms, at least about 1.5 moles of water for every mole of total silane and an effective catalytic amount of an acid at a temperature of about 50° C. to about 160° C. for about 1 to 10 hours, said method comprising the steps of:
(A) providing precuring means, said means comprising a chamber wall and including an inlet and an outlet to said chamber wall;
(B) introducing said prepolymer into said precuring means through the inlet thereof;
(C) forming a film of said prepolymer on the inner surface of said chamber wall;

(D) heating the film on the inner surface of said wall at a temperature of about 90° to 180° C. for a time sufficient to obtain a solvent-soluble, precured polymer that is substantially free of gel; and (E) removing said precured polymer through the outlet of said precuring means.

23. The method of claim 22 and further including wiping said film with a blade while said film is being heated in the manner recited in step D.

24. A method for reproducibly preparing a solvent-soluble, further-curable organic partial condensation product organopolysiloxane precured polymer from an organopolysiloxane prepolymer prepared from the reaction of:

(1) a silane of the group consisting of methyltrialkoxysilane, ethyltrialkoxysilane, phenyltrialkoxysilane, and mixtures thereof in which the alkoxy group contains 1 to 6 carbon atoms, and (2) at least about 1.5 moles of water for every mole of total silane present in the presence of an effective catalytic amount of an acid at a temperature of about 50° C. to 160° C. for about 1 to 10 hours, said method comprising the steps of:

(A) providing a chamber having a generally cylindrical internal surface wall and including an inlet communicating with said wall and an outlet communicating with said wall;

(B) introducing said prepolymer into said inlet;

(C) flowing said prepolymer in a firm along said chamber wall while wiping said film and heating said film at a temperature of about 90° to 180° C. for a time sufficient to obtain a solvent-soluble, precured polymer that is substantially free from gel; and (D) removing said precured polymer through said outlet.

25. The method of claim 24 wherein the mean residence time in said chamber is less than about 40 seconds.

References Cited

UNITED STATES PATENTS 3,395,117  7/1968  Burzynski et al. ____ 260—46.5
3,414,540  12/1968  Nugent et al. _____ 260—46.5

DONALD E. CZAJA, Primary Examiner

M. I. MARQUIS, Assistant Examiner

U.S. Cl. X.R.

117—135.1 R; 159—5 R, 6 R, 6 W, 49 R; 260—33.4, 5 B, 448.8 R; 264—140 R, 144 R